US012643059B2

(12) United States Patent
Maeta et al.

(10) Patent No.: US 12,643,059 B2
(45) Date of Patent: Jun. 2, 2026

(54) SLURRY STORING AND MIXING DEVICE

(71) Applicant: PROTERIAL, LTD., Tokyo (JP)

(72) Inventors: Akihiro Maeta, Tottori-shi (JP);
Kazunori Nishimura, Tokyo (JP)

(73) Assignee: PROTERIAL, LTD., Tokyo (JP)

( * ) Notice: Subject to any disclaimer, the term of this
patent is extended or adjusted under 35
U.S.C. 154(b) by 916 days.

(21) Appl. No.: 16/978,330

(22) PCT Filed: Mar. 5, 2019

(86) PCT No.: PCT/JP2019/008590
§ 371 (c)(1),
(2) Date: Sep. 4, 2020

(87) PCT Pub. No.: WO2019/172235
PCT Pub. Date: Sep. 12, 2019

(65) Prior Publication Data
US 2021/0001289 A1 Jan. 7, 2021

(30) Foreign Application Priority Data
Mar. 8, 2018 (JP) ................................ 2018-041554

(51) Int. Cl.
*B01D 19/00* (2006.01)
*B01D 19/02* (2006.01)
(Continued)

(52) U.S. Cl.
CPC ..... *B01D 19/0005* (2013.01); *B01D 19/0052*
(2013.01); *B01D 19/02* (2013.01);
(Continued)

(58) Field of Classification Search
CPC ...... B01F 33/406; B01F 23/023; B01F 23/23;
B01F 23/231; B01F 23/231151;
(Continued)

(56) References Cited

U.S. PATENT DOCUMENTS 3,238,144 A * 3/1966 Fortman ................... B65B 3/22
516/197
3,259,049 A * 7/1966 Uithoven ................. G03D 3/04
68/183
(Continued)

FOREIGN PATENT DOCUMENTS

CA 2 260 604 A1 6/2000
CH 207033 A * 9/1939
(Continued)

OTHER PUBLICATIONS

International Preliminary Report on Patentability and Translation of
Written Opinion dated Sep. 8, 2020 from the International Bureau
in application No. PCT/JP2019/008590.
(Continued)

*Primary Examiner* — Claire X Wang
*Assistant Examiner* — Patrick M Mccarty
(74) *Attorney, Agent, or Firm* — Sughrue Mion, PLLC

(57) ABSTRACT
An object is to provide a slurry storage and stirring device
which can sufficiently flow even a high-concentration slurry
by a simple means and is excellent in stirring properties.
Disclosed is a slurry storage and stirring device including a
container which stores a slurry containing particles and a
solvent, and in this device, the container has an inner wall
provided inside the container and formed of a porous body
which passes a gas supplied to the container through the
porous body to generate fine bubbles in the slurry.

10 Claims, 3 Drawing Sheets

(51) Int. Cl.
  *B01F 23/50* (2022.01)
  *B01F 33/40* (2022.01)
  *B22F 1/107* (2022.01)

(52) U.S. Cl.
  CPC ............ *B01F 23/50* (2022.01); *B01F 33/406*
  (2022.01); *B22F 1/107* (2022.01)

(58) Field of Classification Search
  CPC ........................ B01F 23/23123; B01F 33/403;
  B01F 33/405; B01F 33/40512; B01D
  19/0005
  See application file for complete search history.

(56) References Cited

U.S. PATENT DOCUMENTS

| | | | | |
|---|---|---|---|---|
| 3,659,752 | A | * | 5/1972 | Carney, Jr. ............. B65D 88/72 |
| | | | | 406/90 |
| 5,106,240 | A | * | 4/1992 | Dirkse ........................ C10J 3/50 |
| | | | | 406/138 |
| 7,434,709 | B2 | * | 10/2008 | Ambs ................. B65B 69/0091 |
| | | | | 141/114 |
| 2005/0244193 | A1 | * | 11/2005 | Amano ............. G03G 15/0877 |
| | | | | 399/258 |
| 2006/0182667 | A1 | * | 8/2006 | Zech ................... B01J 19/0046 |
| | | | | 422/130 |

| | | | | |
|---|---|---|---|---|
| 2010/0155327 | A1 | | 6/2010 | Woodard et al. |
| 2010/0264275 | A1 | * | 10/2010 | Behruzi ................. B64G 1/402 |
| | | | | 96/178 |
| 2013/0178826 | A1 | * | 7/2013 | Li .......................... A61M 5/155 |
| | | | | 604/145 |
| 2016/0280573 | A1 | * | 9/2016 | Livingston ............ C02F 3/1273 |
| 2019/0232303 | A1 | * | 8/2019 | Rademacher ............. B04C 5/04 |
| 2021/0197166 | A1 | * | 7/2021 | Sato .......................... C25B 9/50 |

FOREIGN PATENT DOCUMENTS

| | | | |
|---|---|---|---|
| CN | 102574714 | A | 7/2012 |
| CN | 204746220 | U * | 11/2015 |
| JP | 58-23630 | U | 2/1983 |
| JP | 60-67129 | U | 5/1985 |
| JP | 61-264107 | A | 11/1986 |
| JP | 03-102235 | U | 10/1991 |

OTHER PUBLICATIONS

Japanese Office Action for JP 2019-540104 dated Sep. 20, 2019.
Japanese Office Action for JP 2019-540104 dated Dec. 5, 2019.
International Search Report for PCT/JP2019/008590 dated Jun. 4, 2019 [PCT/ISA/210].
Office Action dated Jun. 23, 2022, issued in Chinese Application No. 201980016962.7.

\* cited by examiner

SLURRY STORING AND MIXING DEVICE

CROSS REFERENCE TO RELATED APPLICATIONS

This application is a National Stage of International Application No. PCT/JP2019/008590 filed Mar. 5, 2019, claiming priority based on Japanese Patent Application No. 2018-041554 filed Mar. 8, 2018.

TECHNICAL FIELD

The present invention relates to a slurry storage and stirring device which stores a slurry while stirring the slurry.

BACKGROUND ART

As one of the intermediate stages of a manufacturing process in various fields, a slurry obtained by mixing a powder and a solvent is well known. For example, when a powder which is a raw material of powder metallurgy, a magnetic core, a magnet, or the like is dry-formed or wet-formed, in the wet-forming, a slurry obtained by mixing the powder and a solvent such as oil is used, and in the dry-forming, a slurry obtained by mixing the powder and a solvent such as water is used.

In a ball mill which is generally used for mixing a powder and a solvent, if mixing is performed for a long time to obtain a slurry with a uniform concentration, there is a problem that a mixing media such as alumina balls, zirconia balls, or iron balls wears out and causes contamination of the slurry. In particular, in metal particles having a specific gravity several times or more larger than a specific gravity of a solvent, there is a problem that when mixing is stopped, the particles and a solvent in a slurry are likely to be separated in a container.

Patent Document 1 describes that a slurry formed of metal particles and a solvent (water) stored in an atomizing chamber is supplied with an inert gas or the like, and stirred by bubbling, so that concentration of the metal particles in the slurry is kept uniform.

PRIOR ART DOCUMENT

Patent Document

Patent Document 1: JP-A-61-264107

SUMMARY OF THE INVENTION

Problems to be Solved by the Invention

FIG. 4 shows a structure of the atomizing chamber disclosed in Patent Document 1. An atomizing chamber 120 is configured such that 20 air supply inlets 180 having a diameter of φ28 mm are dispersed and arranged in a lower cone portion 140. A slurry S in the atomizing chamber 120 is bubbled and stirred by inert gas constantly supplied to the air supply inlet 180 at a predetermined flow rate.

However, due to the structure of the atomizing chamber, there is a region where bubbling does not reach between the air supply inlets 180, resulting in insufficient stirring, and therefore, there is a problem that particles tend to precipitate at a bottom of the atomizing chamber 120.

Since the original purpose is to stir the slurry S in the atomizing chamber 120, the slurry to be handled contains a large amount of solvent, and the slurry concentration (mass concentration of powder in the solvent) is no more than about 10% by mass. In order to efficiently collect the powder, it is desirable to reduce an amount of the solvent and increase the slurry concentration. However, in the structure of the atomizing chamber 120 described in Patent Document 1, the problem of precipitation becomes more remarkable, particle dispersion tends to be uneven, and there is a problem that this structure is not suitable for handling a high-concentration slurry having a slurry concentration of 60% by mass or more.

Thus, an object of the present invention is to provide a slurry storage and stirring device which can sufficiently flow even a high-concentration slurry in a container by a simple means and is excellent in stirring properties.

Means for Solving the Problems

The present invention relates to, in one embodiment, a slurry storage and stirring device including a container which stores a slurry containing particles and a solvent, and in this slurry storage and stirring device, the container has an inner wall provided inside the container and formed of a porous body which passes a gas supplied to the container through the porous body to generate fine bubbles in the slurry.

In one embodiment, the container preferably has a cone portion whose cross-sectional area decreases toward a bottom of the container.

In one embodiment, the inner wall preferably has an inclined portion inclined with respect to a vertical direction.

In one embodiment, at least a portion on the bottom side of the container preferably has a double structure of an inner body having the inner wall in at least a part of the inner body and an outer body provided outside the inner body.

In one embodiment, preferably, the inner body and the outer body are provided to be spaced apart from each other, and a supply port configured to supply the gas to a space between the inner body and the outer body is provided at a bottom of the outer body.

In one embodiment, it is preferable that the inner body and the outer body be configured to be separable from a main body portion on a side opposite to the bottom side of the container.

In one embodiment, the slurry storage and stirring device preferably further includes a defoaming device in the container.

Effect of the Invention

According to the present invention, it is possible to provide a slurry storage and stirring device which can sufficiently flow even a high-concentration slurry in a container by a simple means and is excellent in stirring properties and in which uneven dispersion of a powder into a solvent is unlikely to occur.

MODE FOR CARRYING OUT THE INVENTION

Figure 1:
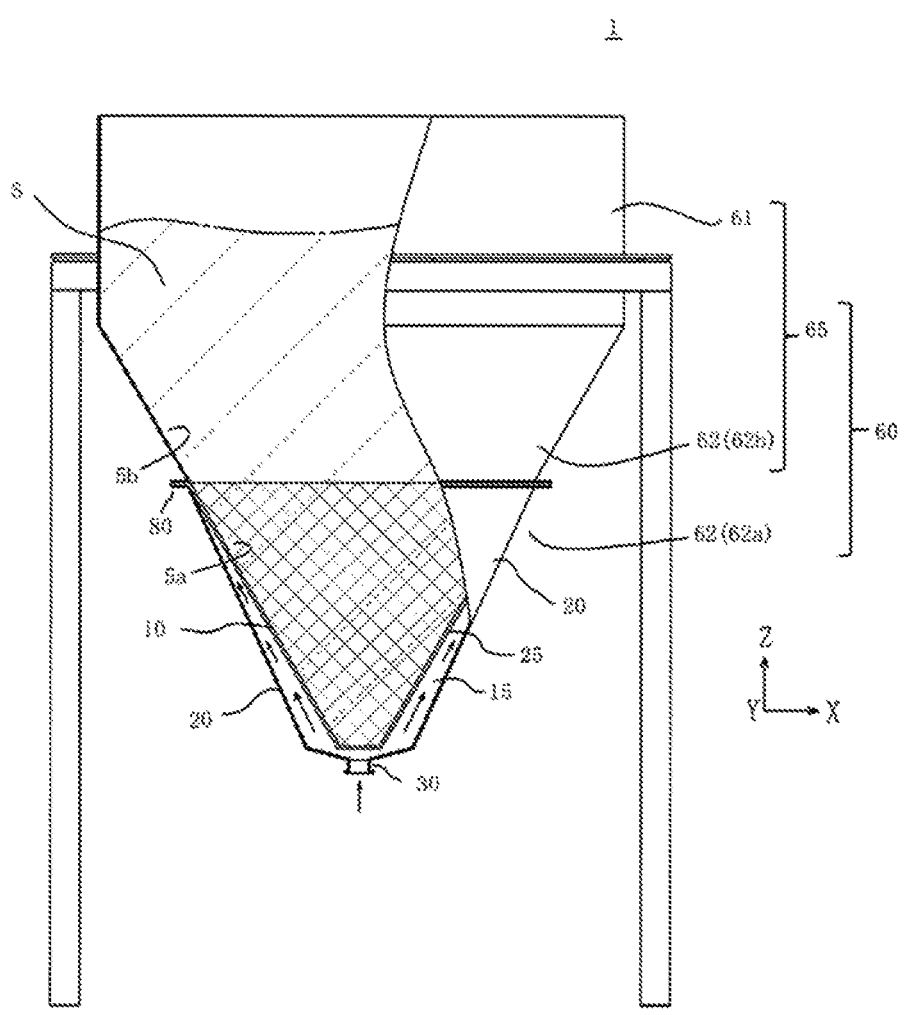
FIG. 1 is a diagram showing a structure of a slurry storage and stirring device according to an embodiment of the present invention.

Hereinafter, a slurry storage and stirring device according to an embodiment of the present invention will be specifically described, but the present invention is not limited thereto, and various modifications can be naturally made without departing from the spirit of the present invention. In the drawings used for the description, an essential part is mainly described so that the gist of the invention can be easily understood, and the detail is appropriately omitted.

FIG. 1 shows a structure of the slurry storage and stirring device according to the embodiment of the present invention. FIG. 1 shows a state where a container is cut partially for easy understanding of a structure of the container. A compressor which sucks and compresses gas and delivers the gas to the container, a pipeline connecting the container and the compressor, a reinforcement beam and the like are omitted, and gas flow paths are indicated by arrows.

A slurry storage and stirring device 1 includes a container 60. The container 60 has a cylindrical portion 61 having a cylindrical shape on an upper side in a Z direction (vertical direction), and has on a lower side a conical-shaped cone portion 62 having a cross-sectional area gradually decreasing downward (bottom portion). Furthermore, the container 60 has an inner wall 25 provided inside the container 60 and formed of a porous body. At least a portion of a conical portion (cone portion 62) on the bottom side of the container 60 has a double structure of an inner body 10 and an outer body 20 provided outside the inner body 10. At least a portion of the inner body 10 includes the inner wall 25 formed of a porous body having fine open pores (hereinafter referred to as pores). The entire inner body 10 may be constituted of the inner wall 25. The container 60 having the cylindrical portion 61 on the upper side in the Z direction (vertical direction) and the cone portion 62 on the lower side (bottom side) can be provided upright by locating a lower portion of the container 60 above an installation surface by support legs. The cylindrical portion 61 is not essential in the present invention, but it can increase the capacity of the container 60 and save a space. The shape of the bottom of the container 60 is not limited to the conical shape, and may be a columnar shape in which the cylindrical portion 61 extends downward as it is. In the case of the columnar shape, a tip on the bottom side may have a channel-shaped cross section or a U-shaped cross section.

FIG. 1 shows an example in which the cone portion 62 is configured by combining and connecting a first cone portion 62*a* on the bottom side and a second cone portion 62*b* on the upper side. The second cone portion 62*b* is integrated with the cylindrical portion 61 to constitute a main body portion 65 of the container 60. The bottom-side first cone portion 62*a* including the inner body 10 and the outer body 20 is configured to be separable from the main body portion 65 of the container 60. The lower first cone portion 62*a* and the upper second cone portion 62*b* are bolt-fastened and fixed by a flange joint 80, and a joint portion is sealed by packing between flanges. The inner wall 25 of the first cone portion 62*a* has an inclined portion 5*a* inclined with respect to the vertical direction, and an inside of the second cone portion 62*b* is also an inclined portion 5*b*, which is entirely reduced in diameter downward. In the illustrated example, an inside of the cone portion 62 in which the first cone portion 62*a* and the second cone portion 62*b* are connected and integrated is a side surface that is continuously and constantly inclined; however, there may be some steps in the joining portion as long as the steps do not affect stirring of the slurry.

The first cone portion 62*a* has a double structure having the inner body 10 and the outer body 20 on an outer periphery thereof, and the inner body 10 and the outer body 20 are arranged to be spaced apart except for a connecting portion with the main body portion 65. A space 15 between the inner body 10 and the outer body 20 serves as a path through which a gas such as air for bubbling or an inert gas supplied to the slurry S in the container 60 flows. A supply port 30 for supplying gas to the space 15 between the inner body 10 and the outer body 20 is provided at the bottom of the outer body 20. In the present embodiment, the inner body 10 includes the inner wall 25 formed of a porous body forming the inclined portion 5*a* inside the first cone portion 62*a*, and supplies fine bubbles to the slurry in the container 60 through the gas delivered from the compressor to the space 15. In the first cone portion 62*a*, the entire circumference of the inner body 10 (that is, the inner wall 25) in the circumferential direction (entire circumference of the inclined portion 5*a*) is preferably formed of a porous body.

Figure 2:
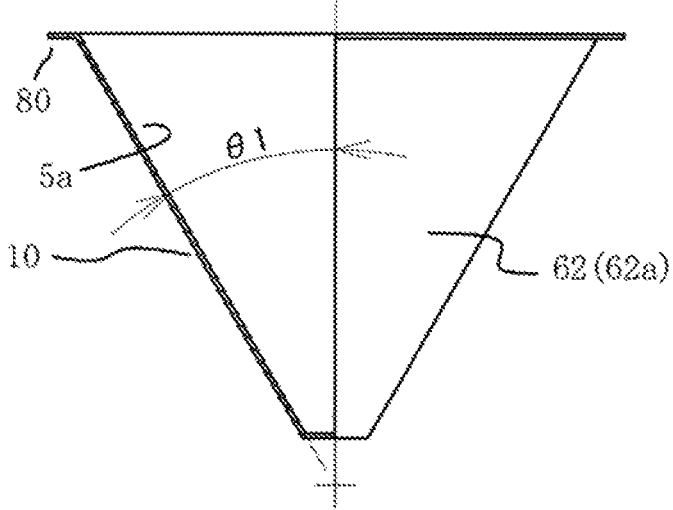
FIG. 2 is a diagram showing a structural example of an inner body constituting a container of the slurry storage and stirring device of the present invention.
Figure 3:
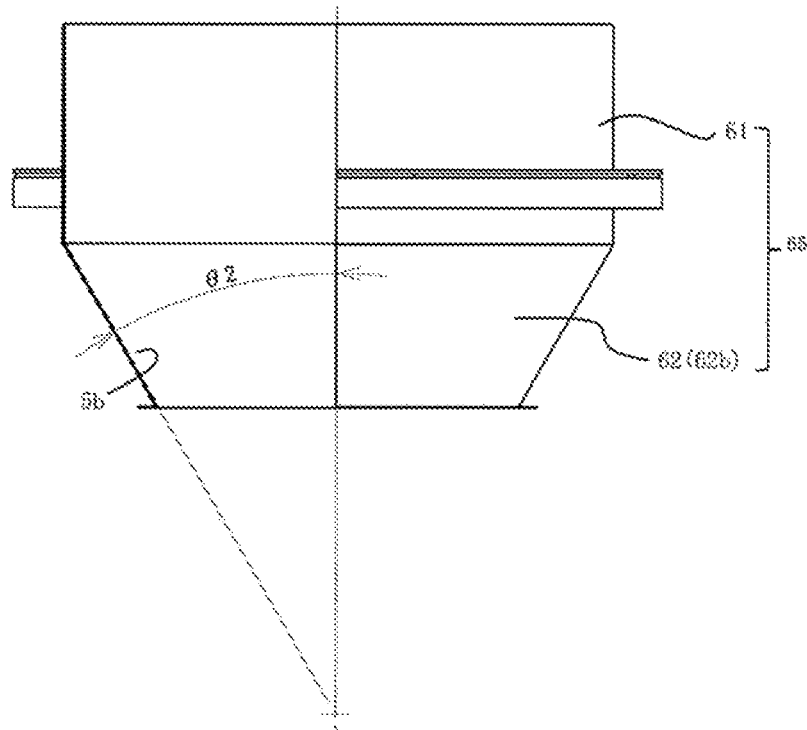
FIG. 3 is a diagram showing a structural example of a main body portion in which a second cone portion and a cylindrical portion which constitute the container of the slurry storage and stirring device of the present invention are integrated.
Figure 4:
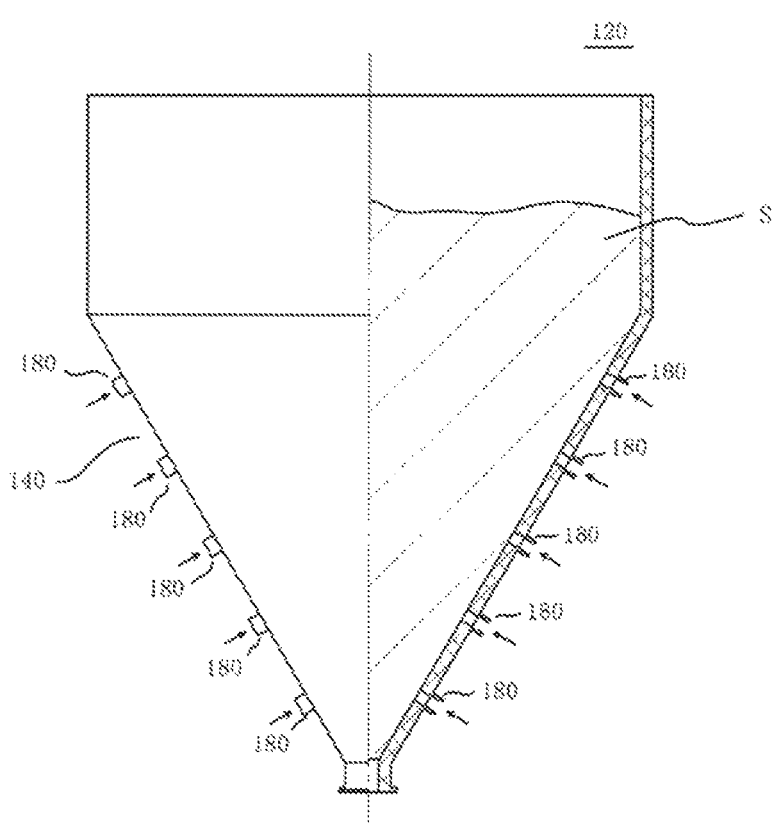
FIG. 4 is a diagram for explaining a configuration of a conventional slurry storage and stirring device.

FIG. 2 is a partial cross-sectional view of the inner body 10 constituting the first cone portion 62*a*, and FIG. 3 is a partial cross-sectional view of the main body portion 65 in which the cylindrical portion 61 and the second cone portion 62*b* are integrated. The inner surfaces of the first cone portion 62*a* (inner body 10) and the second cone portion 62*b* are formed with predetermined inclination angles $\theta 1$ and $\theta 2$, respectively. The inclination angles $\theta 1$ and $\theta 2$ of the inclined portions 5*a* and 5*b* with respect to the vertical direction are preferably 25 to 50° in consideration of stirring the slurry. The inclination angles $\theta 1$ and $\theta 2$ are more preferably 25 to 40°. The inclination angles $\theta 1$ and $\theta 2$ may be the same or different, but it is preferable that the inclination angles be $\theta 1 \geq \theta 2$.

As shown in FIG. 2, the inner body 10 has a hollow bottomed bowl shape, and the inclined portion 5*a* of the inner wall 25 constituting the inner body 10 is configured so as to surround the slurry S. The gas supplied from the compressor is blown into the slurry S through a large number of paths (pores) of the inner body 10 formed of a porous body. A large number of fine bubbles are dispersed in the slurry S from the porous body, and rise, which causes the fine bubbles to spread from the bottom of the container 60 to the upper portion thereof. This allows the slurry S to be forcibly stirred to be in a fluid state. The gas to be supplied is air or an inert gas such as nitrogen, a maximum pressure of the gas supplied from the compressor is preferably 0.05 to 0.6 MPa, and the flow rate of the gas to 1 liter of slurry is preferably 2 liters/min or more.

By providing the inner body 10 in the lower portion (bottom side) of the container 60, even if particles precipitate near an inner surface of the cylindrical portion 61 on the upper side of the container 60, the precipitated particles reach the inner body 10 along the inclined portion 5*b* of the second cone portion 62*b* and are dispersed and convected again in the slurry S by the bubbles from the porous body, so that accumulation of particles in the container 60 can be prevented. In the cone portion 62, it is preferable that the inner body 10 formed of the porous body occupy an area of 10% or more of inner surfaces of the inclined portions 5*a* and 5*b*. More preferred is 20% or more, and still more preferred is 30% or more.

The porous body constituting the inner body 10 may have at least fluid resistance that does not allow the solvent of the slurry to pass therethrough, and withstand a load in a state where the porous body stores the slurry. Preferred materials are any of ceramic materials such as alumina and mullite, resin materials such as polyethylene and polypropylene, and metal materials such as titanium and stainless steel. In consideration of compactibility and processability, resin materials and metal materials are preferable, and from the viewpoints of abrasion resistance and corrosion resistance, the porous body is preferably formed of a metal material such as stainless steel. The material of the other portion of the container 60 and the like in contact with the slurry is also preferably a metal material such as stainless steel from the viewpoints of abrasion resistance and corrosion resistance.

The diameter and shape of the pores in the porous body, or the form of distribution, etc. are various depending on a method of forming the porous body; however, in the present invention, an average pore diameter of the pores of the porous body is not limited as long as the porous body does not allow at least the solvent of the slurry to pass therethrough and the effect of forming fine bubbles can be obtained. The same also applies to the ratio of pores (porosity). If the porous body is commercially available, the porous body may be selected with reference to the manufacturer's nominal value. The average pore diameter is, for example, preferably 3 μm or more and 30 μm or less, and more preferably 3 μm or more and 20 μm or less. The porosity is preferably 30% or more, and more preferably 35% or more.

At least a portion of a ceiling of the container 60 preferably has a lid structure that can be opened and closed so as to supply the solvent and powder forming the slurry. In order to deliver the slurry S to the outside of the container, a delivery pipeline connected to a pump is immersed in the slurry S from the ceiling side of the container 60, and while stirring the slurry S, the slurry S may be delivered to a device such as a molding machine or a dryer in a subsequent step. Alternatively, a delivery port for delivering the slurry S may be provided at a bottom of the inner body 10, and the slurry S may be delivered outside the container 60 through a delivery pipeline connected to the delivery port beyond the outer body 20 from the outside of the container 60.

The solvent used for the slurry in the present invention is not particularly limited, such as general water, alcohols such as ethanol and isopropyl alcohol, and oils such as mineral oils, synthetic oils, and vegetable oils. The powder is also not particularly limited, and may be formed of, for example, a fine ceramic material, a magnetic powder such as soft ferrite or hard ferrite, a magnetic powder such as SmCo magnet or NdFeB magnet, a magnetic powder of a crystalline or amorphous Fe-based alloy of Fe—Si alloy, Fe—Cr alloy, Fe—Cr—Si alloy, Fe—Al alloy, Fe—Al—Si alloy, Fe—Al—Cr alloy, Fe—Al—Cr—Si alloy, Fe—Ni alloy, or Fe-M-B alloy (M is at least one of Si, Cr, Al and Ni), or a non-magnetic metal powder such as stainless steel or super steel, and as a metal powder having a larger specific gravity is used, the effect of the present invention is more remarkable, which is preferable.

The powder is obtained by, for example, a pulverizing method or an atomizing method such as gas atomizing or water atomizing, and is a powder having an average particle diameter defined by the median diameter d50 of about 0.5 μm to 200 μm.

The slurry concentration (concentration based on the mass of the powder in the solvent) is not particularly limited, and may be 10, by mass or more, 20% by mass or more, or 30% by mass or more. The slurry storage and stirring device according to the present embodiment can correspond to a high-concentration slurry of 60% by mass or more, 70% by mass or more, or 80% by mass or more. However, if the slurry concentration is too high, the stirring properties and handling properties of the slurry may deteriorate, so that the slurry concentration is preferably 90% by mass or less, and more preferably 85% by mass or less.

Next, an example of a slurry stirring method by the slurry storage and stirring device 1 will be described. First, a solvent such as water is supplied into the container 60 from the ceiling side of the container 60. By operating the compressor provided near the container 60, fine bubbles of air are dispersed in the solvent through the inner body 10 formed of the porous body to perform bubbling. A powder and, if necessary, a binder (for example, organic binder such as polyethylene, polyvinyl alcohol (PVA), polyvinyl butyral (PVB), or an acrylic resin) are charged from the ceiling side of the container 60. If necessary, a solvent is further added, and stirring is performed by bubbling. This makes it possible to obtain a slurry in which the particles are uniformly dispersed in the solvent. By continuously operating the compressor, the slurry S can be stored in the container 60 while maintaining the stirring state. Even if the compressor is stopped, by operating the compressor again and performing stirring, a slurry in which the particles are uniformly dispersed in the solvent can be obtained. Of course, after the solvent and the powder and, if necessary, the binder are charged into the container 60, the compressor may be operated, and bubbling and stirring may be performed. In addition to bubbling with fine bubbles, a known member (stirring blade or the like) for stirring the slurry may be used together.

When gas is blown into the slurry containing the binder, the gas-entrained slurry may foam. When the slurry having undergone such foaming is sprayed and dried, granules having a low bulk density are easily formed. It is preferable to provide a defoaming device (not shown) for eliminating bubbles generated in the container 60 in order to prevent a decrease in bulk density of the granules, and for other purposes. As the defoaming device, for example, a stirring machine having a stirring portion such as a stirring blade rotatable in the container 60 or a centrifugal stirring member (for example, the rotor for stirring described in Japanese Patent No. 4418019) is suitable. The stirring portion is disposed at an upper side inside the container 60, and bubbles rising to a liquid surface of the slurry are broken, so that foaming of the slurry can be suppressed. Instead of the stirring machine or together with the stirring machine, an ultrasonic sound pressure generated by ultrasonic irradiation may be used to break and defoam the bubbles.

EXAMPLES

A device having the same structure as the slurry storage and stirring device shown in FIG. 1 was produced. The container 60 is constituted of the cylindrical portion 61 and the cone portion 62, the cylindrical portion 61 has a diameter of φ700 mm, and the height of the container 60 excluding the support leg is 900 mm. In the cone portion 62, the inclination angle θ1 of the inclined portion 5a of the inner body 10 (inner wall 25) constituting the first cone portion 62a and the inclination angle θ2 of the inclined portion 5b of the second cone portion 62b are each 30°. Thus, an inner surface (slurry contact surface) of the cone portion 62 is continuous and has an inclination angle of 30°. As the inner body 10, a commercially available stainless steel porous body was used. The porous body is formed into a cone shape by stacking multiple stainless steel nets with openings of 5 μm. The height of the cone portion 62 (62a, 62b) in the vertical direction was 530 mm, of which the height of the first cone portion 62a was set to 220 mm, and about 30% of the inclined portions 5a and 5b of the cone portion 62 (62a, 62b) was constituted of the inner body 10 formed of the porous body.

Ion-exchanged water was used as a solvent, and a magnetic powder obtained by an atomizing method was used as a powder. A Fe—Al—Cr alloy powder with an average particle diameter d50 of 10 μm was used. Bubbling was performed while storing the ion-exchanged water in the container 60, and a total amount of water was set to 125 liters, and 500 kg of Fe—Al—Cr alloy magnetic powder was charged thereto and stirred to prepare a slurry having a concentration of 80% by mass. During the stirring, 3 liter/min of air per liter of slurry was supplied at an air pressure of 0.5 MPa from the compressor.

Although the slurry storage and stirring device 1 was continuously operated for three days, particles and water were not separated in the container 60, and after the slurry was withdrawn, neither precipitation nor accumulation of the particles on the lower portion of the container 60 was observed.

DESCRIPTION OF REFERENCE SIGNS

1 slurry storage and stirring device
5a inclined portion of first cone portion
5b inclined portion of second cone portion
10 inner body
15 space
20 outer body
25 inner wall
60 container
61 cylindrical portion
62 cone portion
62a first cone portion
62b second cone portion
65 main body portion
S slurry

The invention claimed is:

1. A slurry storage and stirring device comprising a container which stores a slurry containing particles and a solvent,
    wherein the container has an inner wall provided inside the container and formed of a porous body which passes a gas supplied to the container through the porous body to generate fine bubbles in the slurry,
    the porous body comprises pores having an average pore diameter which does not allow the solvent of the slurry to pass through the porous body,
    the container has a cylindrical portion having a cylindrical shape on an upper side in a vertical direction, and has a conical-shaped cone portion under the cylindrical portion; wherein the cone portion has a cross-sectional area gradually decreasing downward;
    wherein the cone portion has a top side and a bottom side and each inner surface of the top side and the bottom side are formed with inclined portions, and the porous body is disposed on the bottom side and occupies an area of 10% or more of inner surfaces of the entire inclined portions,
    the cone portion is configured by directly combining and connecting two components of a first cone portion on the bottom side and a second cone portion on the upper side; and
    the inner wall is only in the first cone portion;
    wherein at least a portion on the bottom side of the cone portion has a double structure of an inner body having the inner wall in at least a part of the inner body and an outer body provided outside the inner body, and the inner body has a bowl shape having a closed bottom.

2. The slurry storage and stirring device according to claim 1, wherein each inner surface of the top side and the bottom side has an inclination angle of 25 to 50° with respect to the vertical direction.

3. The slurry storage and stirring device according to claim 1, wherein the inner body and the outer body are provided to be spaced apart from each other, and
    a supply port configured to supply the gas to a space between the inner body and the outer body is provided at a bottom of the outer body.

4. The slurry storage and stirring device according to claim 1, wherein the inner body and the outer body are configured to be separable from a main body portion comprising the top side of the cone portion and the cylindrical portion.

5. The slurry storage and stirring device according to claim 1, wherein the porous body comprises pores having an average pore diameter of 3 μm or more and 30 μm or less.

6. The slurry storage and stirring device according to claim 1, wherein the porous body comprises pores having an average pore diameter of 3 μm or more and 20 μm or less.

7. The slurry storage and stirring device according to claim 1,
    wherein a material of the porous body is metal material.

8. The slurry storage and stirring device according to claim 1, further comprising a defoaming device in the container.

9. The slurry storage and stirring device according to claim 8, wherein the defoaming device is a stirring machine having a stirring portion which is a stirring blade rotatable in the container.

10. The slurry storage and stirring device according to claim 8, wherein the defoaming device is a stirring machine having a stirring portion which is a centrifugal stirring member.

* * * * *